US012735924B2

(12) United States Patent
Harger, II et al.

(10) Patent No.: US 12,735,924 B2
(45) Date of Patent: Sep. 15, 2026

(54) QUICK RELEASE AUTOMOTIVE CHECK STRAP ASSEMBLY

(71) Applicant: FCA US LLC, Auburn Hills, MI (US)

(72) Inventors: Anthony J Harger, II, Auburn Hills, MI (US); Mark L Lusky, Auburn Hills, MI (US)

(73) Assignee: FCA US LLC, Auburn Hills, MI (US)

(*) Notice: Subject to any disclaimer, the term of this patent is extended or adjusted under 35 U.S.C. 154(b) by 58 days.

(21) Appl. No.: 18/958,502

(22) Filed: Nov. 25, 2024

(65) Prior Publication Data

US 2026/0146489 A1 May 28, 2026

(51) Int. Cl.

| | |
|---|---|
| ***E05C 17/26*** | (2006.01) |
| ***E05C 17/20*** | (2006.01) |
| *E05F 5/06* | (2006.01) |

(52) U.S. Cl.

CPC ............ *E05C 17/26* (2013.01); *E05C 17/203* (2013.01); *E05F 5/06* (2013.01); *E05Y 2900/531* (2013.01)

(58) Field of Classification Search

CPC ........ E05C 17/203; E05C 17/20; E05C 17/12; E05C 17/04; E05C 17/22; E05C 17/24; E05C 17/26; E05C 17/28; E05F 5/06

See application file for complete search history.

(56) References Cited

U.S. PATENT DOCUMENTS 5,862,570 A 1/1999 Lezuch et al.
5,924,170 A * 7/1999 Papke ................. B05B 13/0292 16/334
6,438,794 B2 * 8/2002 Ng ........................ E05C 17/203 16/82
11,613,170 B2 3/2023 Neag et al.
11,629,535 B2 * 4/2023 Kroll ....................... E05C 17/36 16/82
11,725,435 B2 * 8/2023 Papoulias ............... E05C 17/04 16/319
12,448,825 B2 * 10/2025 Neag ..................... E05C 17/203
2019/0010741 A1 1/2019 Youn et al.
2023/0061227 A1 * 3/2023 Neag ..................... E05C 17/045

OTHER PUBLICATIONS

International Search Report and Written Opinion dated Apr. 22, 2026 for International Application No. PCT/US2025/056242, International Filing Date Nov. 20, 2025.

* cited by examiner

*Primary Examiner* — Jeffrey O'Brien
(74) *Attorney, Agent, or Firm* — Jeremy J. Klobucar

(57) ABSTRACT

A quick release check strap assembly configured between a vehicle door and a vehicle body includes a check arm, a pin clip assembly, and a clevis bracket assembly. The check arm extends between the vehicle door and the vehicle body. The pin clip assembly includes a pin and a retention spring clip. The pin includes a head and a shaft, the head defining a pin passage. The retention spring clip has an upper loop section, a lower loop section and an intermediate arm section including first and second spring arms, wherein the upper loop section extends through the pin passage. The clevis bracket assembly has upper and lower mounting bores that receive the pin, upper spring locating features that define an upper notch, and lower spring locating features that define a lower notch.

15 Claims, 6 Drawing Sheets

QUICK RELEASE AUTOMOTIVE CHECK STRAP ASSEMBLY

FIELD

The present application relates generally to automotive check stop straps on vehicle doors and, more particularly, to a tool-less quick release check strap assembly.

BACKGROUND

Some vehicles are designed such that some or all of the doors can be removed for a door-less driving experience. In general, a vehicle door is coupled to the vehicle body with one or more door check assemblies. A door check assembly can generally include a first bracket coupled to the door, a second bracket coupled to the vehicle body and a check arm that extends between the first and second brackets. Typically, the first and second brackets can be fixed to the respective door and vehicle body with fasteners. In one prior art example of removing a vehicle door from the vehicle body, a user removes a fastener that couples the check arm to the vehicle body thereby releasing the check arm and vehicle door from the vehicle body. The user can then take the door away from the vehicle and store it safely. Removal of the door using the above door check assembly can be cumbersome and time consuming. For example, a tool is needed to remove the fastener(s). Variation of user applied torque for reinstallation of the fastener(s) can enable the bracket to become loose creating risk of noise and/or part damage. Continuous reinstallation of the fastener(s) can weaken bolt threads and enable the door check assembly to become loose over time also creating risk of noise and/or part damage. If the tool needed for fastener removal is lost or broken, door removal cannot be accomplished. If the fastener is lost or broken, door removal cannot be accomplished. In this regard, while existing door check configurations can be satisfactory, there remains a need for improvement in the relevant art.

SUMMARY

In accordance with one example aspect of the invention, a quick release check strap assembly configured between a vehicle door and a vehicle body includes a check arm, a pin clip assembly, and a clevis bracket assembly. The check arm extends between the vehicle door and the vehicle body, the check arm having a mounting knuckle that defines a check arm bore. The pin clip assembly includes a pin and a retention spring clip. The pin includes a head and a shaft, the head defining a pin passage. The retention spring clip has an upper loop section, a lower loop section and an intermediate arm section including first and second spring arms, wherein the upper loop section extends through the pin passage. The clevis bracket assembly has upper and lower mounting bores that receive the pin, upper spring locating features that define an upper notch, and lower spring locating features that define a lower notch. The retention spring clip is movable from (i) an installed position where the upper and lower spring locating features capture the first and second spring arms; (ii) a first removal position wherein the first and second arms are deflected toward each other; and (iii) a second removal position wherein the first and second arms are rotated around the spring locating features and out of the upper and lower notches.

In addition to the foregoing, the clevis bracket assembly comprises a steel bracket and a plastic over-mold.

In addition to the foregoing, the upper and lower spring locating features are formed on the plastic over-mold.

In addition to the foregoing, the upper loop section of the retention spring clip is configured to rotate about an axis defined by the pin passage from the first to the second removal position.

In addition to the foregoing, the lower loop section of the retention spring clip includes a user engaging portion that visibly extends from the clevis bracket assembly.

In other examples, the upper and lower spring locating features are normally biased into the installed position.

In addition to the foregoing, the retention spring clip is movable to a final removal position wherein the shaft of the pin is translated out of the upper and lower mounting bores of the clevis bracket and the check arm bore.

In examples, the clevis bracket assembly defines a door mounting aperture that receives a fastener that couples the clevis bracket assembly to the vehicle body, wherein the fastener remains coupled between the clevis bracket assembly and the vehicle body subsequent to the final removal position.

In other examples, the clevis bracket includes a misalignment feature configured to assist in guiding the retention spring clip into the installed position.

In some implementations, the misalignment feature includes a first clip guide formation and a second clip guide formation.

In other examples, the first clip guide formation includes a first wall configured to abut one of the first and second spring arms during an incorrect alignment of the first and second spring arms toward the upper and lower spring locating features.

In further examples, the upper spring locating feature comprises first and second upper fingers.

In some examples, the first and second upper fingers define ramped surfaces that facilitate locating the first and second spring arms into the upper locating notch.

In additional features, the lower spring locating feature comprises first and second lower fingers.

In additional examples, the first and second lower fingers define ramped surfaces that facilitate locating the first and second spring arms into the lower locating notch.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously discussed, a door check assembly can include a first bracket coupled to the door, a second bracket coupled to the vehicle body and a check arm that extends between the first and second brackets. Typically, the first and second brackets can be fixed to the respective door and vehicle body with one or more fasteners. In one prior art example of removing a vehicle door from the vehicle body, a user removes a fastener that couples the second bracket to the vehicle body thereby releasing the check arm and vehicle door from the vehicle body. The user can then take the door away from the vehicle and store it safely. Removal of the door using such a door check assembly can be cumbersome and time consuming requiring specific tools and requiring a user to keep track of loose components (fasteners) and tools.

The present disclosure provides a tool-less quick release check strap assembly. The tool-less quick release check strap assembly includes a check arm, a pin clip assembly and a clevis bracket assembly. The pin clip assembly can be moved from an installed position to a release position by deflecting first and second spring arms toward each other to clear upper and lower spring locating features on the clevis bracket assembly. The spring can then be rotated up and away from the upper and lower spring locating features. The pin of the pin clip assembly can then be translated up and out of the clevis bracket mounting bores and the check arm bore thereby freeing the check arm from the clevis bracket assembly. The door can then be taken away from the vehicle. The removal (and reinstallation) process is simple, repeatable and requires no tools.

Figure 1:
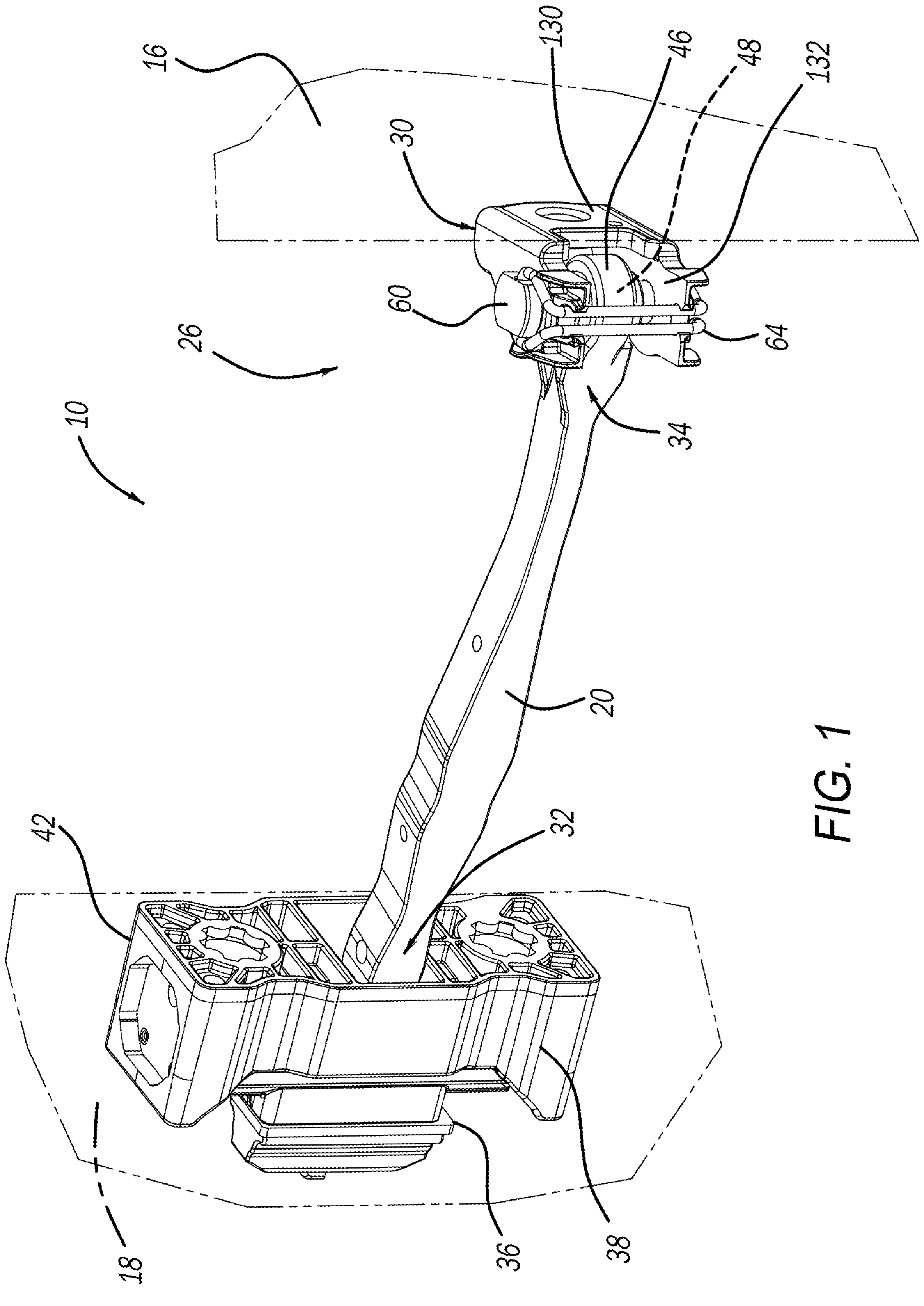
FIG. 1 is a front perspective side view of a check strap assembly including a pin clip assembly and a clevis bracket assembly constructed according to the principles of the present disclosure and shown installed between a vehicle door and a vehicle body.

Referring now to FIG. 1, a tool-less quick release check strap assembly is shown and generally identified at reference numeral 10. The tool-less quick release check strap assembly 10 is shown installed relative to a vehicle body 16 and a vehicle door 18. The tool-less quick release check strap assembly 10 generally comprises a check arm 20, a pin clip assembly 26 and a clevis bracket assembly 30. The check arm 20 can extend between a first end 32 configured to be coupled to the door 18 and a second end 34 configured to be coupled to the vehicle body 16 by way of the clevis bracket assembly 30. A door mounting feature 36 is arranged at the first end 32 of the check arm 20 and locates relative to a door bracket 38 at a check strap detent housing 42 formed in the door 18. The second end 34 of the check arm 20 generally defines a mounting knuckle 46 that defines a check arm bore 48.

Figure 4:
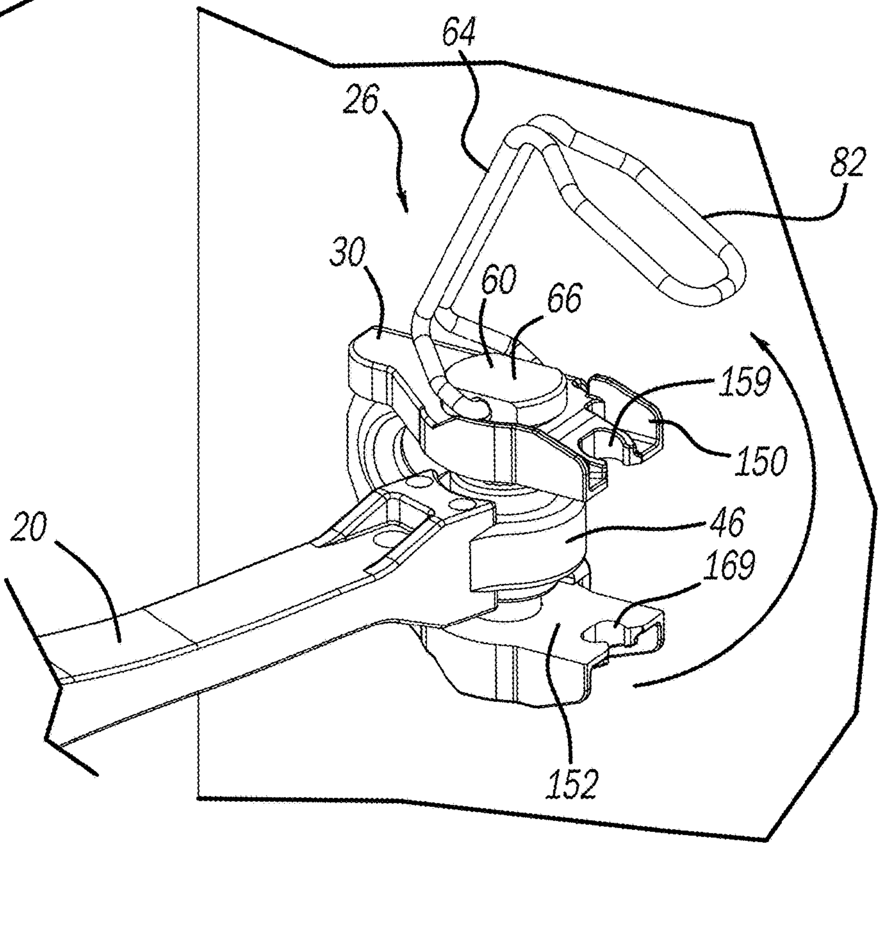
FIG. 4 is a front perspective view of the pin clip assembly shown in a first removal position subsequent to the spring arms being displaced toward each other to clear the upper and lower spring locating features on the clevis bracket assembly and the spring being rotated up and away from the upper and lower spring locating features on the clevis bracket.
Figure 5:
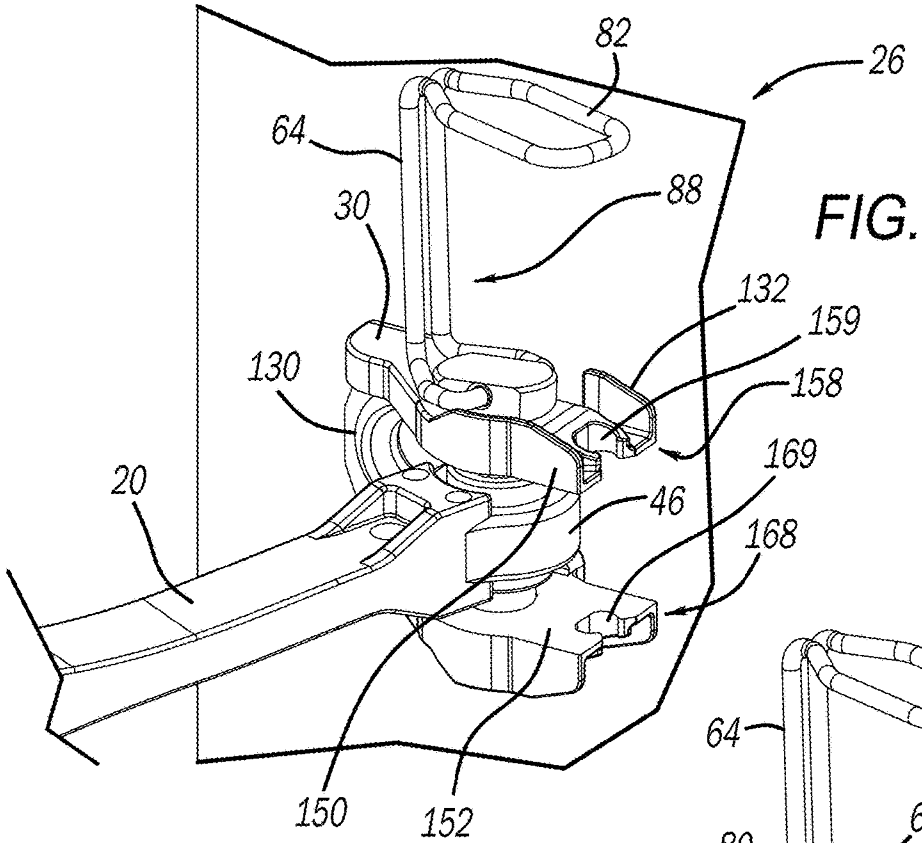
FIG. 5 is a front perspective view of the pin clip assembly of FIG. 4 and shown in a second removal position with the spring being further rotated away from the upper and lower spring locating features on the clevis bracket.
Figure 6:
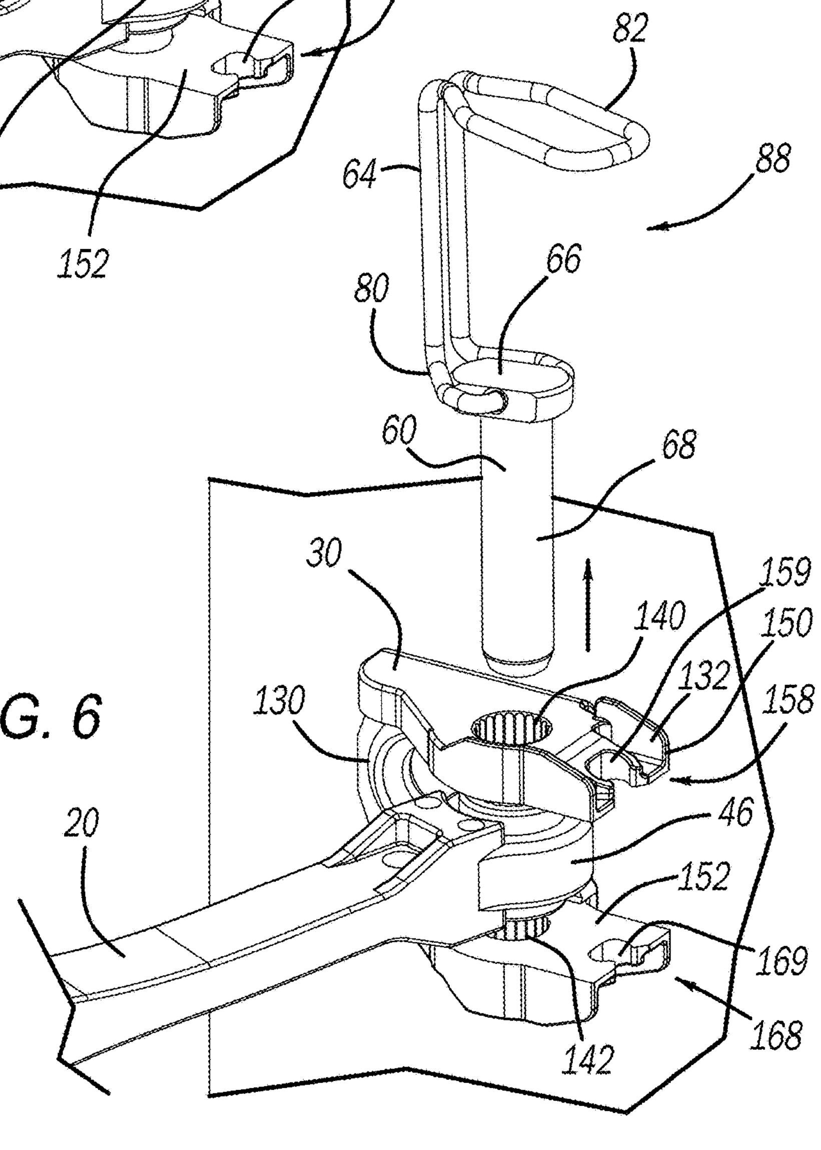
FIG. 6 is a front perspective view of the pin clip assembly of FIG. 5 and shown in a third removal position with the pin of the pin clip assembly being translated up and out of the clevis bracket mounting bores and the check arm bore thereby freeing the check arm from the clevis bracket assembly.
Figure 7:
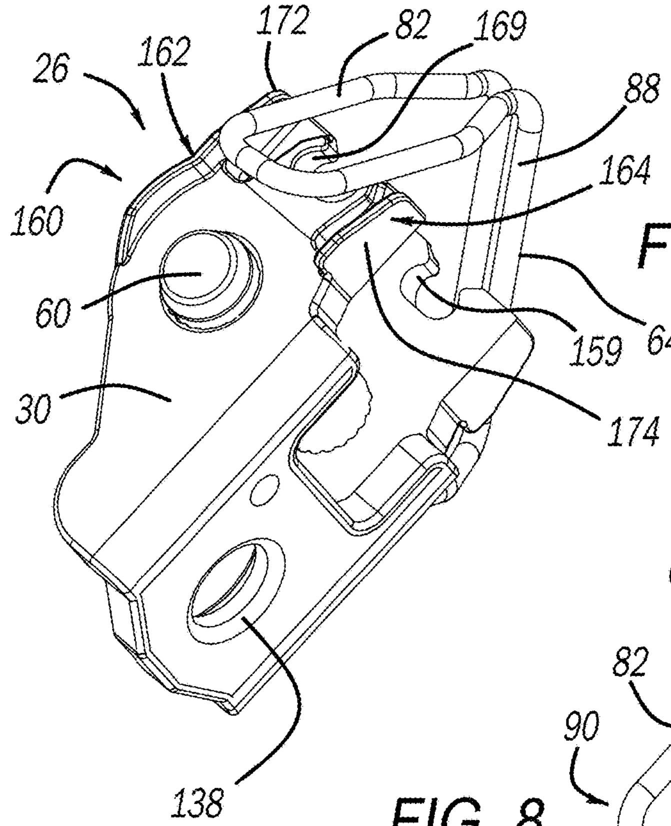
FIG. 7 is a bottom perspective view of the pin clip assembly showing a clip misalignment feature provided on the clevis bracket assembly and constructed in accordance to one example of the present disclosure.

With continued reference to FIG. 1 and additional reference now to FIGS. 2-6, additional features of the check strap assembly 10 will be further described. The pin clip assembly 26 generally comprises a pin 60 and a retention spring clip 64. The pin 60 includes a head 66 and a shaft 68 (FIG. 6). The head 66 of the pin 60 defines a pin passage 74 that receives the retention spring clip 64. As will be described herein, the retention spring clip 64 can be rotated about an axis 78 defined by the pin passage 74 during a removal or installation sequence.

Figure 8:
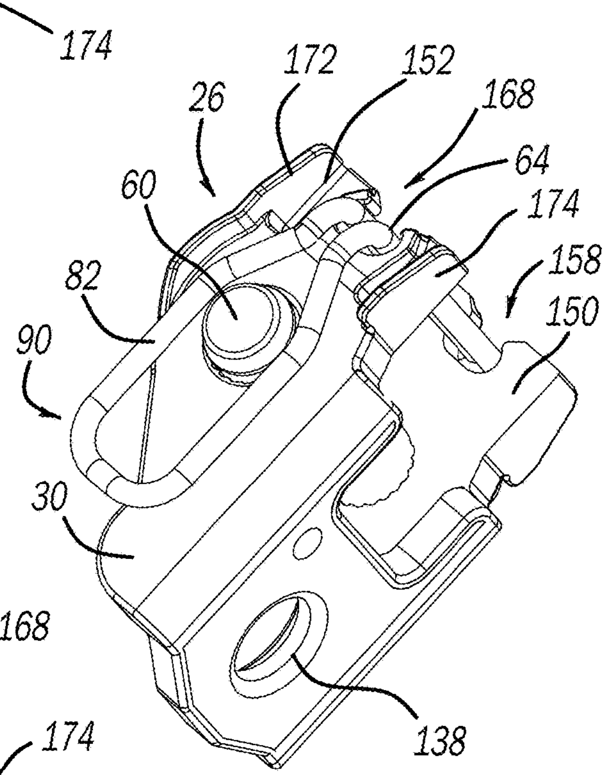
FIG. 8 is a bottom perspective view of the pin clip assembly of FIG. 8 and shown with the spring in the installed or nominal position.

The retention spring clip 64 generally includes an upper loop section 80, a lower loop section 82 and an intermediate arm section 88. The upper loop section 80 extends through the pin passage 74 of the pin 60. The lower loop section 82 positively locates relative to the clevis bracket assembly 30 in an installed position (FIG. 8). As described more fully herein, the lower loop section 82 further includes a user engaging portion 90 (FIG. 3) that visibly extends from the clevis bracket assembly 30 for identifying to the user the area of the retention spring clip 64 to engage during an initial removal sequence. The intermediate arm section 88 includes first and second arms 110 and 112.

Figure 2:
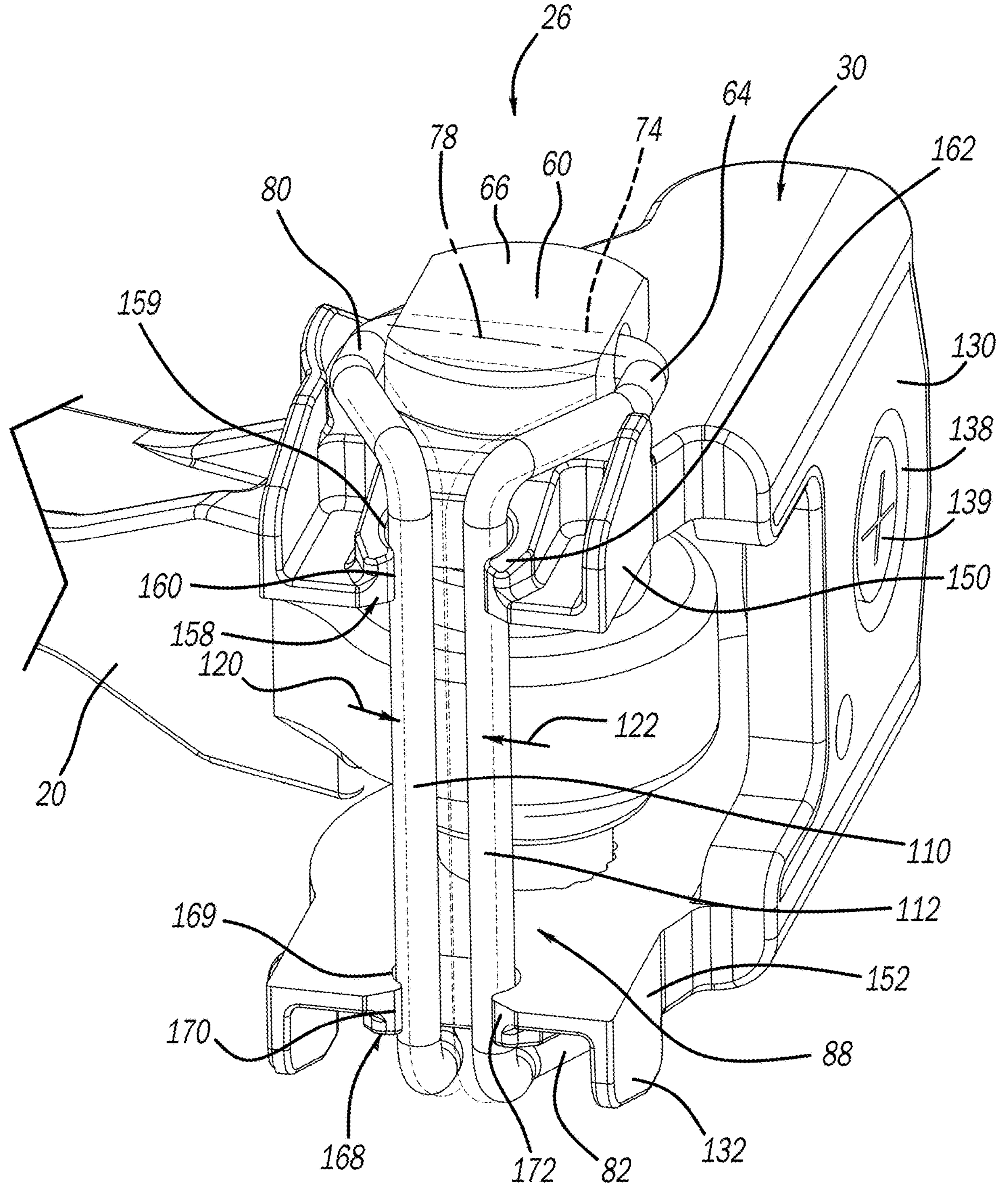
FIG. 2 is a front perspective view of the check strap assembly of FIG. 1 and showing spring arms of the pin clip assembly in an installed position (solid line) and in a removal position (phantom line) according to an example of the present disclosure.

In one example, the retention spring clip 64 is formed of rigid metal material that is capable of deflecting (phantom lines, FIG. 2) and returning to an original position (solid lines, FIG. 2). As shown in FIG. 2, the first and second arms 110 and 112 normally occupy a position identified by solid lines and can be deflected toward each other to a location identified by phantom lines. Notably, the first and second arms 110 and 112 can be deflected toward each other (such as by a users' fingers depressing the first and second arms 110 and 112 in the direction identified by arrows 120 and 122) to clear spring locating features of the clevis bracket 30.

The clevis bracket assembly 30 will be further described. The clevis bracket assembly 30 generally includes a steel bracket 130 and a plastic over-mold 132. The steel bracket 130 defines a door mounting aperture 138 for receiving a fastener 139 to attaches the clevis bracket assembly 30 to the vehicle body 16. The clevis bracket assembly 30 defines upper and lower mounting bores 140 and 142 (FIG. 6), respectively. The clevis bracket assembly 30 includes an upper spring locating feature 150 and a lower spring locating feature 152. The upper spring locating feature 150 includes an upper retention feature 158 having first and second upper fingers 160, 162. The upper retention feature 158 defines an upper notch 159 generally between the first and second upper fingers 160, 162. Similarly, the lower spring locating feature 152 includes a lower retention feature 168 having first and second lower fingers 170, 172. The lower retention feature 168 defines a lower notch 169 generally between the first and second lower fingers 170, 172.

In an installed position (FIG. 3), the first and second spring arms 110, 112 are positively located at the upper notch 159 and the lower notch 169. Notably, the installed position, the first and second upper fingers 160, 162 and the first and second lower fingers 170, 172 capture the first and second spring arms 110, 112. Explained further, the first and second spring arms 110 and 112 are normally biased into the installed position (solid line) such that the first and second upper fingers 160, 162 and the first and second lower fingers 170, 172 partially wrap around and therefore contain the first and second spring arms 110 and 112 at the respective notches 159, 169. When installing the spring arms 110 and 112 into the respective notches 164 and 174 a user can feel and hear a positive clicking or snap feedback from the spring arms 110 and 112 as they navigate around the first and second upper fingers 160, 162 and the first and second lower fingers 170, 172 reaching the notches 159 and 169 confirming to the user that the pin clip assembly 26 has reached the locked, installed position relative to the clevis bracket assembly 30.

Figure 3:
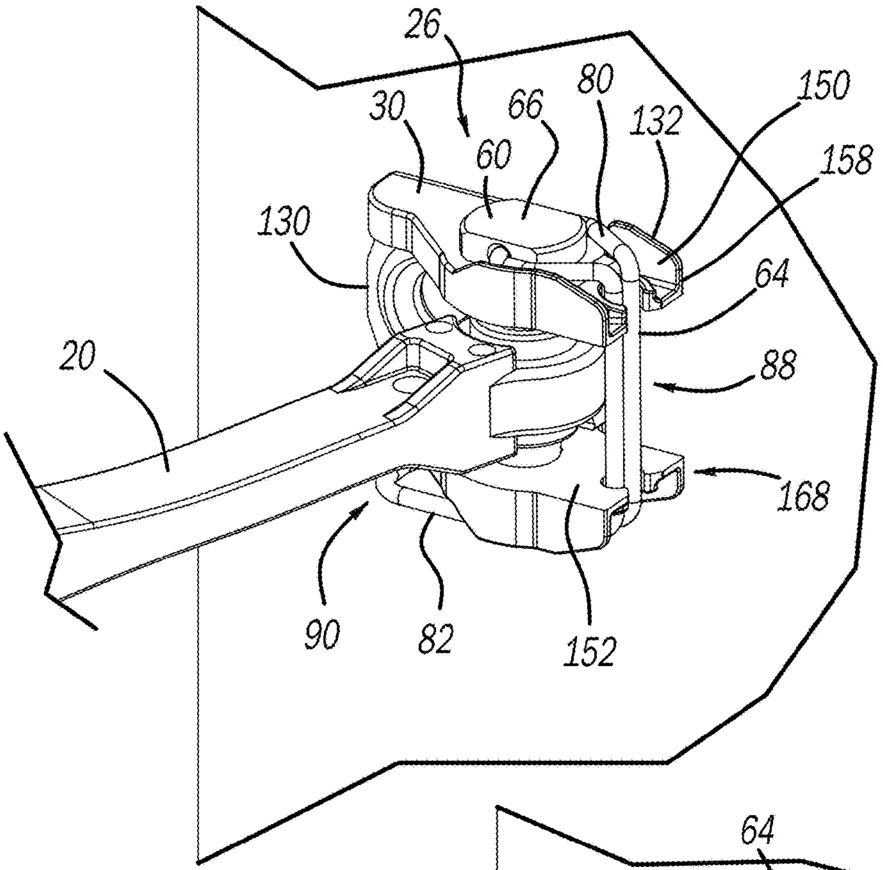
FIG. 3 is a front perspective view of the check strap assembly of FIG. 1 and shown in an installed position with the pin clip assembly positively located in an installed, locked position into the clevis bracket assembly.

With specific reference now to FIGS. 3-6, an exemplary sequence for removing the pin clip assembly 26 from the clevis bracket assembly 30 for removing the check arm 20 will be described. FIG. 3 shows a front perspective view of the check strap assembly 10 shown in an installed position with the pin clip assembly 26 in a home or installed position locked into the clevis bracket assembly 30.

FIG. 4 shows the retention spring clip 64 in a first removal position subsequent to the spring arms 110, 112 being displaced toward each other (phantom line location, FIG. 2) to clear the upper and lower spring locating features 158, 168 on the clevis bracket assembly 30 and the retention spring clip 64 being rotated out of the notches 159, 169 and up and away from the upper and lower spring locating features 158, 168.

FIG. 5 shows the retention spring clip 64 in a second removal position with the retention spring clip 64 being further rotated away from the upper and lower spring locating features 158, 168.

FIG. 6 shows the retention spring clip 64 in a third (or final) removal position with the pin 60 of the pin clip assembly 26 being translated up and out of the upper and lower clevis bracket mounting bores 140, 142 and the check arm bore 48 thereby freeing the check arm 20 from the clevis bracket assembly 30. It will be appreciated that installation of the check strap assembly 10 is accomplished in reverse order. Notably, the first and second upper fingers 160, 162 and the first and second lower fingers 170, 172 have ramped surfaces that facilitate locating the first and second spring arms 110 and 112 into the respective upper and lower spring locating notches 159 and 169.

With particular reference now to FIG. 7-9D, additional features of the clevis bracket assembly 30 will be further described. The clevis bracket assembly 30 includes a clip misalignment feature 160 having a first clip guide formation 162 and a second clip guide formation 164. The clip misalignment feature 160 assists in guiding the retention spring clip 64 into the installed (home) position during an installation step. The first clip guide formation 162 includes a first wall 172. The second clip guide formation 164 includes a second wall 174.

Figure 9A:
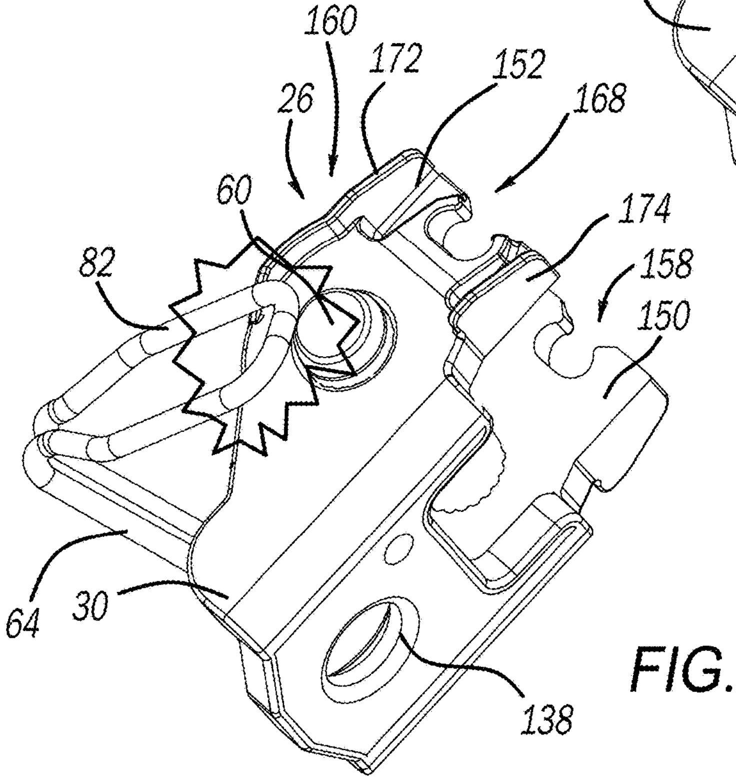
FIG. 9A is a bottom perspective view of the pin clip assembly of FIG. 8 and shown in a first interference position conveying to a user an incorrect orientation, the first interference position shown at 120 degrees from the nominal position shown in FIG. 8.

FIG. 9A is a bottom perspective view of the pin clip assembly 26 of FIG. 8 and shown in a first interference position conveying to a user an incorrect orientation. In the example illustrated, the first interference position is shown with the arms 110, 112 rotated at about 120 degrees from the nominal position shown in FIG. 8. The arms 110, 112 engage the first wall 172 of the clip misalignment feature 160 conveying to the user an incorrect placement of the retention spring clip 64.

Figure 9B:
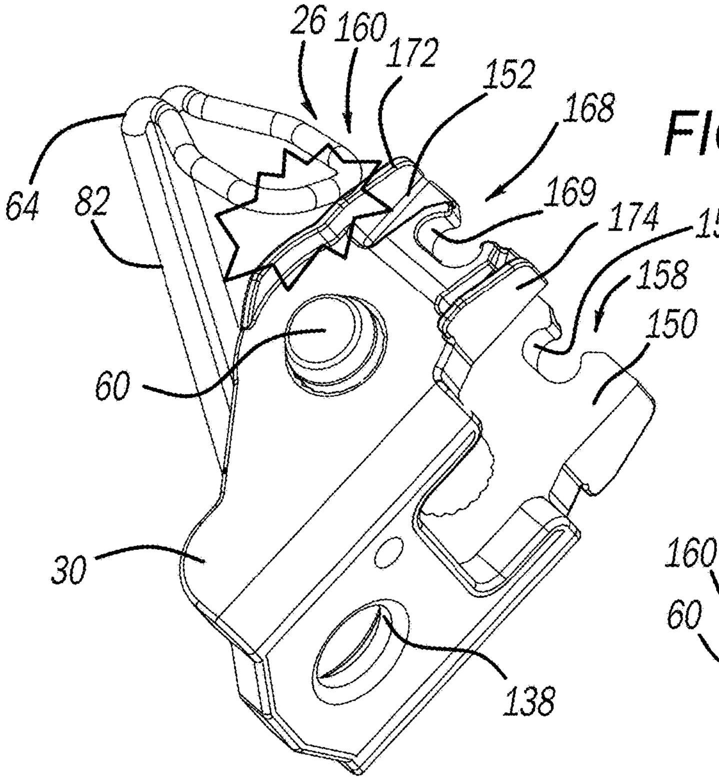
FIG. 9B is a bottom perspective view of the pin clip assembly of FIG. 8 and shown in a second interference position conveying to a user an incorrect orientation, the second interference position shown at 60 degrees from the nominal position shown in FIG. 8.

FIG. 9B is a bottom perspective view of the pin clip assembly 26 of FIG. 8 and shown in a second interference position conveying to a user an incorrect orientation. In the example illustrated, the second interference position is shown with the arms 110, 112 rotated at about 60 degrees from the nominal position shown in FIG. 8. The arms 110, 112 engage the first wall 172 of the clip misalignment feature 160 conveying to the user an incorrect placement of the retention spring clip 64.

Figure 9C:
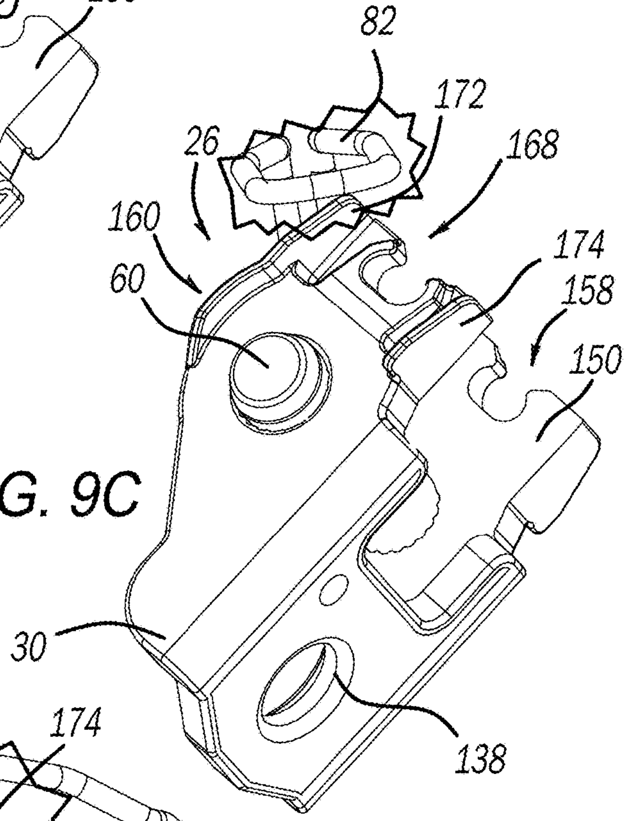
FIG. 9C is a bottom perspective view of the pin clip assembly of FIG. 8 and shown in a third interference position conveying to a user an incorrect orientation, the third interference position shown at 45 degrees from the nominal position shown in FIG. 8.

FIG. 9C is a bottom perspective view of the pin clip assembly 26 of FIG. 8 and shown in a third interference position conveying to a user an incorrect orientation. In the example illustrated, the third interference position shown with the arms 110, 112 rotated at about 45 degrees from the nominal position shown in FIG. 8. The arms 110, 112 engage the first wall 172 of the clip misalignment feature 160 conveying to the user an incorrect placement of the retention spring clip 64.

Figure 9D:
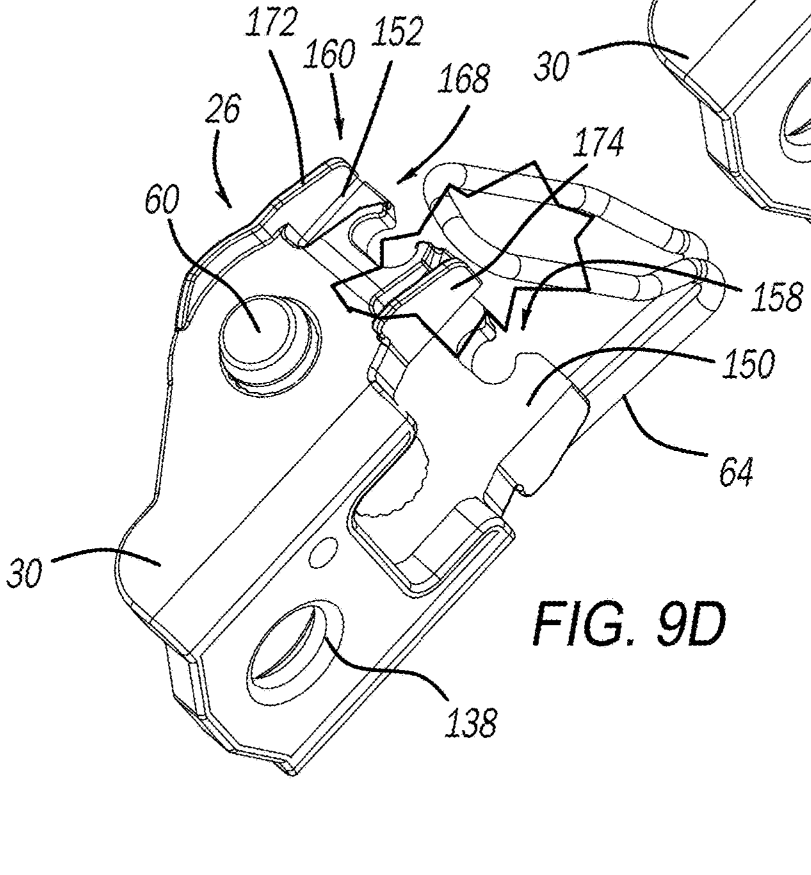
FIG. 9D is a bottom perspective view of the pin clip assembly of FIG. 8 and shown in a fourth interference position conveying to a user an incorrect orientation, the fourth interference position shown at 15 degrees from the nominal position shown in FIG. 8.

FIG. 9D is a bottom perspective view of the pin clip assembly 26 of FIG. 8 and shown in a fourth interference position conveying to a user an incorrect orientation. In the example illustrated, the fourth interference position is shown with the arms 110, 112 rotated at about 15 degrees from the nominal position shown in FIG. 8. The arms 110, 112 engage the second wall 174 of the clip misalignment feature 160 conveying to the user an incorrect placement of the retention spring clip 64.

It will be appreciated that while only select interference positions have been illustrated at FIGS. 9A-9B, the clip misalignment feature 160 will provide feedback by impacting the retention spring clip 64 at a plurality of other locations in the event that the arms 110, 112 are not aligned for receipt between the first and second upper fingers 160, 162 and the first and second lower fingers 170, 172 that facilitate locating the first and second spring arms 110 and 112 into the respective upper and lower spring locating notches 159, 169.

The check strap assembly 10 according to the present disclosure does not require additional steps to secure the clevis bracket assembly 30 as the clevis bracket assembly 30 can remain fixed to the vehicle body 16 (by way of the fastener 139, FIG. 2). The retention spring clip 64 is formed of metal and provides a constant tension against the plastic over-mold 132 of the clevis bracket assembly 30 mitigating noise. Moreover, the material properties of the metal retention spring clip 64 and the plastic over-mold 132 of the clevis bracket assembly 30 prevents early onset of corrosion. Only two unique components (e.g., the pin clip assembly 26 and the clevis bracket assembly 30) are required from conventional door check configurations.

The clip misalignment feature 160 prevents the pin clip assembly 26 from being installed out of position simplifying the installation process. The geometries of the pin clip assembly 26 and the clevis bracket assembly 30 achieve acceptable clearances between the clevis bracket assembly 30 and the surrounding environment. The check strap assembly 10 is compatible with previously existing housing design requirements.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A quick release check strap assembly configured between a vehicle door and a vehicle body, the check strap assembly comprising:

- a check arm that extends between the vehicle door and the vehicle body, the check arm having a mounting knuckle that defines a check arm bore;
- a pin clip assembly comprising:
  - a pin including a head and a shaft, the head defining a pin passage; and
  - a retention spring clip having an upper loop section, a lower loop section and an intermediate arm section including first and second spring arms, wherein the upper loop section extends through the pin passage; and
- a clevis bracket assembly having upper and lower mounting bores that receive the pin, an upper spring locating feature that define an upper notch, and a lower spring locating feature that define a lower notch;
- wherein the retention spring clip is movable from (i) an installed position where the upper and lower spring locating features capture the first and second spring arms; (ii) a first removal position wherein the first and second arms are deflected toward each other; and (iii) a second removal position wherein the first and second arms are rotated around the spring locating features and out of the upper and lower notches.

2. The quick release check strap assembly of claim 1, wherein the clevis bracket assembly comprises a steel bracket and a plastic over-mold.

3. The quick release check strap assembly of claim 2, wherein the upper and lower spring locating features are formed on the plastic over-mold.

4. The quick release check strap assembly of claim 1, wherein the upper loop section of the retention spring clip is configured to rotate about an axis defined by the pin passage from the first to the second removal position.

5. The quick release check strap assembly of claim 1, wherein the lower loop section of the retention spring clip includes a user engaging portion that visibly extends from the clevis bracket assembly.

6. The quick release check strap assembly of claim 2, wherein the upper and lower spring locating features are normally biased into the installed position.

7. The quick release check strap assembly of claim 1, wherein the retention spring clip is movable to a final removal position wherein the shaft of the pin is translated out of the upper and lower mounting bores of the clevis bracket and the check arm bore.

8. The quick release check strap assembly of claim 1, wherein the clevis bracket assembly defines a door mounting aperture that receives a fastener that couples the clevis bracket assembly to the vehicle body, wherein the fastener remains coupled between the clevis bracket assembly and the vehicle body subsequent to the final removal position.

9. The quick release check strap assembly of claim 1, wherein the clevis bracket includes a misalignment feature configured to assist in guiding the retention spring clip into the installed position.

10. The quick release check strap assembly of claim 9, wherein the misalignment feature includes a first clip guide formation and a second clip guide formation.

11. The quick release check strap assembly of claim 10, wherein the first clip guide formation includes a first wall configured to abut one of the first and second spring arms during an incorrect alignment of the first and second spring arms toward the upper and lower spring locating features.

12. The quick release check strap assembly of claim 11, wherein the upper spring locating feature comprises first and second upper fingers.

13. The quick release check strap assembly of claim 12, wherein the first and second upper fingers define ramped surfaces that facilitate locating the first and second spring arms into the upper locating notch.

14. The quick release check strap assembly of claim 13, wherein the lower spring locating feature comprises first and second lower fingers.

15. The quick release check strap assembly of claim 14, wherein the first and second lower fingers define ramped surfaces that facilitate locating the first and second spring arms into the lower locating notch.

* * * * *